(12) United States Patent
Skov et al.

(10) Patent No.: US 7,881,461 B2
(45) Date of Patent: Feb. 1, 2011

(54) METHOD AND APPARATUS FOR CONVEYING BIDIRECTIONAL DATA, POWER AND TIMING SIGNALS USING A SINGLE TRANSFORMER

(75) Inventors: James B. Skov, Laguna Niguel, CA (US); Ketankumar B. Patel, Lake Forest, CA (US); Faouzi Chaahoub, Rancho Santa Margarita, CA (US); Thomas G. Beutler, Tustin, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 2197 days.

(21) Appl. No.: 10/697,819

(22) Filed: Oct. 31, 2003

(65) Prior Publication Data

US 2005/0093731 A1    May 5, 2005

(51) Int. Cl.
  *H04M 1/00* (2006.01)
  *H04M 9/00* (2006.01)
(52) U.S. Cl. ..................................... 379/412
(58) Field of Classification Search ........... 379/412
  See application file for complete search history.

(56) References Cited

U.S. PATENT DOCUMENTS

| | | | | |
|---|---|---|---|---|
| 5,056,118 A | * | 10/1991 | Sun | 375/342 |
| 5,204,879 A | * | 4/1993 | McConnell | 375/293 |
| 5,369,378 A | * | 11/1994 | Kosaka et al. | 332/104 |
| 5,424,709 A | * | 6/1995 | Tal | 375/259 |
| 5,594,329 A | * | 1/1997 | van Ettinger et al. | 324/96 |
| 6,219,380 B1 | * | 4/2001 | Wang et al. | 375/239 |
| 6,259,723 B1 | * | 7/2001 | Miyashita | 375/141 |
| 6,265,948 B1 | * | 7/2001 | Stevenson | 332/101 |
| 6,351,530 B1 | * | 2/2002 | Rahamim et al. | 379/399.01 |
| 6,519,339 B1 | * | 2/2003 | Sacca et al. | 379/412 |
| 6,977,536 B2 | * | 12/2005 | Chin-Chieh et al. | 327/116 |
| 6,978,013 B1 | * | 12/2005 | Zwick | 379/412 |
| 7,158,573 B2 | * | 1/2007 | Hershbarger | 375/258 |
| 7,277,491 B2 | * | 10/2007 | Dong et al. | 375/258 |
| 2004/0153543 A1 | * | 8/2004 | Thomas | 709/225 |

OTHER PUBLICATIONS

Hershbarger "A Method and Apparatus for Full Duplex Signaling across a transformer", U.S. Appl. No. 60/474,009, filed on May 29, 2003.*

* cited by examiner

*Primary Examiner*—Alexander Jamal
(74) *Attorney, Agent, or Firm*—Jackson Walker L.L.P.; Christopher J. Rourk

(57) ABSTRACT

Transformer driven by data modulated signal provides isolated power. Outbound data is extracted from the data modulated signal received from the transformer. Inbound data received in isolated circuitry modulates the load presented to transformer. Inbound data perceived in non-isolated circuitry by sensing load experienced by the transformer.

20 Claims, 10 Drawing Sheets

METHOD AND APPARATUS FOR CONVEYING BIDIRECTIONAL DATA, POWER AND TIMING SIGNALS USING A SINGLE TRANSFORMER

FIELD OF THE INVENTION

This invention pertains to isolated electrical interfaces; specifically to isolated data interfaces that require isolated power.

BACKGROUND OF THE INVENTION

Attaching electronic devices to communication channels has always been fraught with peril. Specifically, there is an inherent danger to the integrity of any electronic circuit whenever there is a possibility that portions of the circuit can be exposed to large voltage potentials. One example of this situation can be seen in modulator/demodulator circuits; commonly called "modems".

In order to lessen the probability of such voltage induced damage, modems and telephone systems, in general, have long utilized isolative circuits. Isolative circuits introduce an electrical, or "galvanic" barrier between a first electronic system and another. Isolative circuits are also known to protect electronic circuits from unintended voltage potentials induced by static electricity, e.g. lightening strikes. In modem applications, isolative circuits are normally introduced between the actual modem function and a communications channel that is used to convey a modem signal to a remote location.

An isolative circuit generally comprises a power transformer that is used to generate an isolated power source. This isolated power source can be used to power an isolated portion of a circuit. In a modem circuit, the isolative circuit further comprises a collection of high-voltage capacitors. These capacitors straddle the galvanic barrier and are used to convey information between a non-isolated portion of the circuit and an isolated portion of the circuit. Because modems are typically used to communicate with a telephone-line based communications channel, the non-isolated portion of the circuit is generally referred to as the "system side" whereas the isolated portion of the circuit is referred to as the "line side".

Up until now, the conveyance of data across the galvanic barrier has been accomplished by exploiting the alternating current (AC) nature of the data signals traveling outward from the system side and inward from the line side. The term "AC" is used here in reference to any signal that varies in voltage over time. Because these data signals exhibit AC characteristics, they are able to "jump" the galvanic barrier just like any other AC signal; they are able to flow through a capacitor. Direct current (DC) components in the signals, such as any unwanted high-voltage level, are effectively blocked by the capacitors. Hence the old axiom-capacitors can be thought of as an open circuit with respect to DC signals.

Everyone knows that price competition drives every aspect of the economy. The personal computer market is no exception and continues to see falling prices as competition continues to rage. Any modem that is designed for mass production must be sensitive to this. One problem that has continued to plague modem manufacturers is the cost associated with the isolative circuit. The isolative circuit simply cannot be abandoned because the galvanic barrier that it provides is necessary not only to protect the system from inadvertent exposure to high voltage, but also to comply with various design requirements that govern communications equipment. For example, these design requirements dictate that an isolative barrier capable of withstanding 4,000 Volts of potential difference must be provided in a modem.

Examining the components necessary to implement the galvanic barrier, it quickly becomes apparent that the transformer and the high-voltage capacitors represent a significant portion of the material cost of a typical commercial modem. It would be advantageous if these costs could be either reduced or eliminated entirely.

SUMMARY OF THE INVENTION

The present invention comprises a method and an apparatus for conveying bidirectional data over a transformer. According to the method of the present invention, an electronic circuit having a non-isolated portion and an isolated portion that are separated by a galvanic barrier may exchange data across the galvanic barrier using the transformer. Generally, a modem comprises such isolated and non-isolated portions in its circuitry. The isolated circuitry generally requires isolated power in order to function. Although the invention is introduced in context of a communications system, it is applicable in a wide array of applications and the scope of the appended claims is not intended to be limited to any one particular embodiment described herein.

According to one illustrative method, the transformer is driven by an AC signal that is modulated with outbound data. The outbound data may be extracted from the modulated signal in the isolated portion of the circuitry. Generally, the modulated signal is received from the transformer. In order to convey inbound data from the isolated portion of the circuit to the non-isolated portion of the circuit, one alternative method provides that the inbound data may be used to vary the load presented to the second side of the transformer. This may be accomplished by varying the impedance presented to the transformer according to a serial bitstream that has been synchronized with an extracted clock signal. This second side of the transformer is also known as a "secondary" winding. This secondary winding may be used to deliver isolated power to the electronic circuitry constituting the isolated portion of the circuit.

According to one alternative method of the present intention, the AC signal driving the transformer may be modulated by altering its phase according to a serial bitstream coincident with a clock signal. According to another example method of the present invention, once the AC signal is received in the isolated portion of the circuit, outbound data may be extracted by first extracting a clock signal from the received modulated signal and then sampling the received modulated signal using the extracted clock signal. One variation of the present method provides that extraction of a clock signal may be accomplished by generating an independent clock and then synchronizing the independent clock with the transitions perceived in the received modulated signal.

When used in modem applications, one alternative of the present method provides for generating an analog signal according to the outbound data extracted from the modulated AC signal received from the transformer. Generally, a communications channel is terminated in a modem with a circuit load. The analog signal may then be used as the basis for varying the impedance of the circuit load. The voltage across the circuit load may be monitored in order to perceive incoming data from the communications channel. Accordingly, one illustrative method of the present invention provides for generating a digital value representative of the voltage across the circuit load. This digital value may then be used to vary the impedance presented to the second side of the transformer used to power the isolated portion of the circuit and from which the AC signal modulated with outbound data is received.

The present invention further comprises an apparatus for conveying bidirectional data across a galvanic barrier. One illustrative embodiment of such an apparatus comprises a signal generator and a signal modulator. The modulator modulates the signal produced by the signal generator with outbound data. According to one alternative embodiment, the modulator comprises a phase modulator. Hence, the signal produced by the signal generator may be altered in phase according to outbound data coincident with a clock.

The apparatus further comprises a transformer that is used to convey the outbound-data modulated signal across the galvanic barrier. A data extractor constituting the apparatus extracts outbound data from the modulated signal once it is received in an isolated portion of an electronic circuit. According to one example embodiment of the present invention, the data extractor may comprise a clock extractor and a sampling device. According to this alternative embodiment, the clock extractor extracts a clock from a received modulated signal. This clock controls a sampling device that samples the received modulated signal in order to extract the outbound data. In yet another alternative embodiment of the present invention, the clock extractor comprises a controllable oscillator that actually generates a clock. The clock extractor further comprises a comparator that generates a control signal for controlling the controllable oscillator. The comparator derives the control signal by comparing transitions in a received modulated signal with transitions in the clock generated by the controllable oscillator.

One illustrative embodiment of the invention further comprises a transformer load modulator and an inbound data recovery unit. When inbound data is received in the isolated portion of an electronic circuit, the transformer load modulator modulates the load presented to the second side of the transformer in accordance with the inbound data. The inbound data recovery unit senses these load modulations as they are reflected into the primary of the transformer. Load modulations may then be used to determine the inbound data. According to one alternative embodiment of the present invention, the load modulator comprises an impedance element, a switch and a synchronizer. Inbound data is synchronized with an extracted clock signal by the synchronizer and used to control a switch that attaches the impedance element to the second side of the transformer in accordance with the synchronized inbound data.

One alternative embodiment of the apparatus further comprises a digital-to-analog converter that generates an analog signal according to outbound data extracted from the modulated signal received in an isolated portion of an electronic circuit. The invention further comprises a line circuit load used to terminate a communications channel and an impedance element. An analog gate, further constituting one illustrative embodiment of the invention, is used to linearly impart the impedance element across the line circuit load according to the analog signal.

According to yet another alternative embodiment of the present invention, the apparatus further comprises an analog-to-digital converter that generates a digital value according to the voltage present across the line circuit load. The impedance element used to vary the load presented to the transformer as a means for conveying inbound data back to a non-isolated portion of an electronic circuit is switched across said transformer by a switch constituting the invention. Accordingly, this switch is controlled by the digital value generated by the analog-to-digital converter.

The method of the present invention may also be embodied in a "system-side" isolation controller. Such a system-side isolation controller may be utilized in a modem design, e.g. in a non-isolated portion of such a design. A system-side isolation controller according to one example embodiment of the present invention comprises a signal generator, a signal modulator and an inbound data recovery unit. According to one alternative embodiment of the present invention, the system-side isolation controller further comprises a transformer driver. Outbound data is used by the modulator as the basis for modulating a signal generated by the signal generator. The modulated signal may then be directed to the transformer driver. The output of the transformer driver may then be used to drive a transformer with sufficient power in order to simultaneously provide isolated power to an isolated portion of an electronic circuit and to convey outbound data across a galvanic barrier.

In yet another alternative embodiment of the invention, the method of the present invention may be embodied as a "line-side" isolation controller. The line-side isolation controller of the present invention may be used in a modem design, e.g. in electronic circuitry constituting an isolated portion of said modem. According to one illustrative embodiment, a line-side isolation controller comprises a data extractor and a transformer load modulator. According to yet another alternative embodiment of the present invention, the data extractor constituting the line-side isolation controller comprises a clock extractor and a sampling device according to the teachings of the method and apparatus of the present invention. In yet another alternative embodiment of a line-side isolation controller, a digital-to-analog converter, an analog gate, an analog-to-digital converter, an impedance element and a switch all further comprise the invention. These elements of the line-side isolation controller may be used to embody a modem according to the descriptions provided earlier in this summary.

BRIEF DESCRIPTION OF THE DRAWINGS

The foregoing aspects are better understood from the following detailed description of one embodiment of the invention with reference to the drawings, in which.

The components in the figures are not necessarily to scale, emphasis instead being placed upon illustrating the principles of the invention. In the figures, like reference numerals designate corresponding parts throughout the different views.

DETAILED DESCRIPTION OF THE INVENTION

Figure 1:
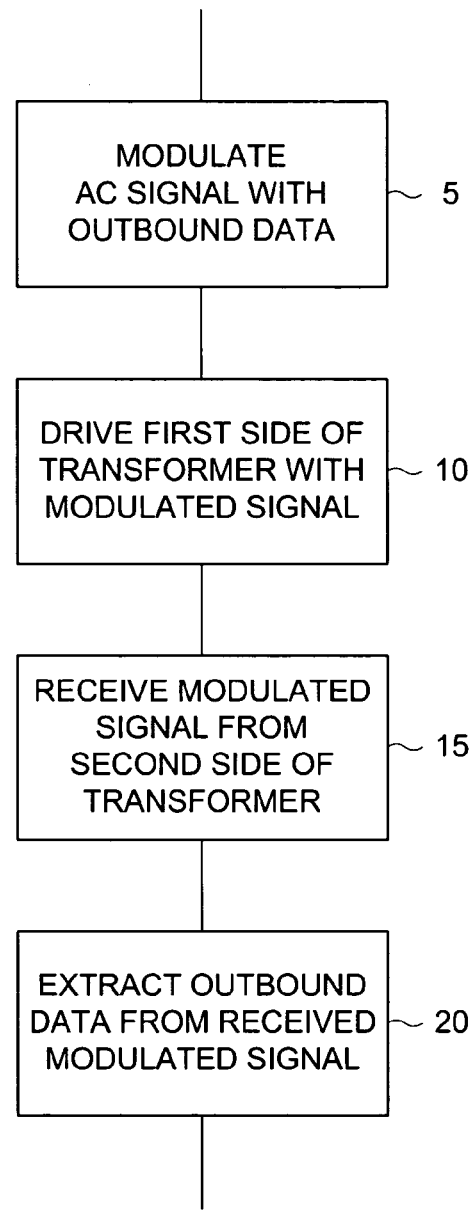
FIG. 1 is a flow diagram that depicts one illustrative method for communicating bidirectional data across a galvanic barrier according to the present invention.

FIG. 1 is a flow diagram that depicts one illustrative method for communicating bidirectional data across a galvanic barrier according to the present invention. In a typical modem, a portion of the circuitry remains referenced to a "system ground". This system ground is electrically common with most of the electronic components found in a system. It is relative to this system ground that most data that must be communicated to an external system is developed. Data received from an external system must also be received back into the system referenced to this system ground.

According to one illustrative method, data that must be communicated to an external system may be used to modulate an AC signal (step 5). Once modulated with "outbound" data, the AC signal may be used to drive a first side of a transformer (step 10). The transformer is used to provide a galvanic barrier between a non-isolated portion of an electronic circuit and an isolated portion of the electronic circuit. The modulated AC signal may then be received from a second side of the transformer (step 15). According to this illustrative method, outbound data may then be extracted from the received modulated AC signal (step 20). Reception of the modulated AC signal and subsequent extraction of outbound data may be accomplished by circuitry constituting the isolated portion of the electronic circuit. According to one alternative method of the present invention, modulation of an AC signal is accomplished by altering the phase of the signal according to a bit stream. Phase alterations may occur coincided with a clock.

Figure 2:
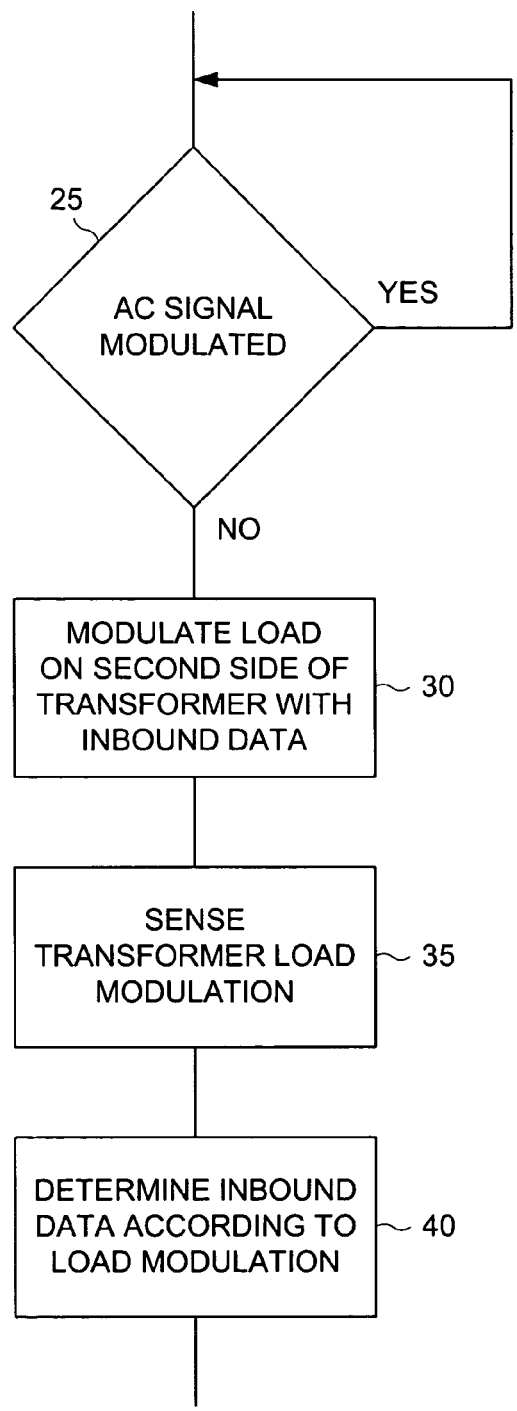
FIG. 2 is a flow diagram that depicts additional steps according to one illustrative method of the present invention for communicating bidirectional data across a galvanic barrier.

FIG. 2 is a flow diagram that depicts additional steps according to one illustrative method of the present invention for communicating bidirectional data across a galvanic barrier. In order to receive data from the isolated portion of the electronic circuit, one variation of the present method further provides that such reception may occur when the AC signal received from the second side of the transformer is not modulated with data (step 25). This is indicative that outbound data is not being communicated during a particular interval of time. In this event, "inbound" data may be used to modulate the load presented to the second side of the transformer (step 30). Accordingly, variations in the load experienced by the transformer may be sensed (step 35) by circuitry constituting the non-isolated portion of the electronic circuit. Inbound data may be determined by sensing the variations in the load experienced by the transformer (step 40). According to one example method of the present invention, modulation of the load experienced by the transformer may be accomplished by varying the impedance presented to the transformer according to a serial data stream. This may be accomplished coincident with a clock extracted from the AC signal received from the transformer. In yet another alternative method, sensing of load variations experienced by the transformer may be accomplished by sensing variations in the amount of power drawn by the primary side (i.e. the first side) of the transformer.

Figure 3:
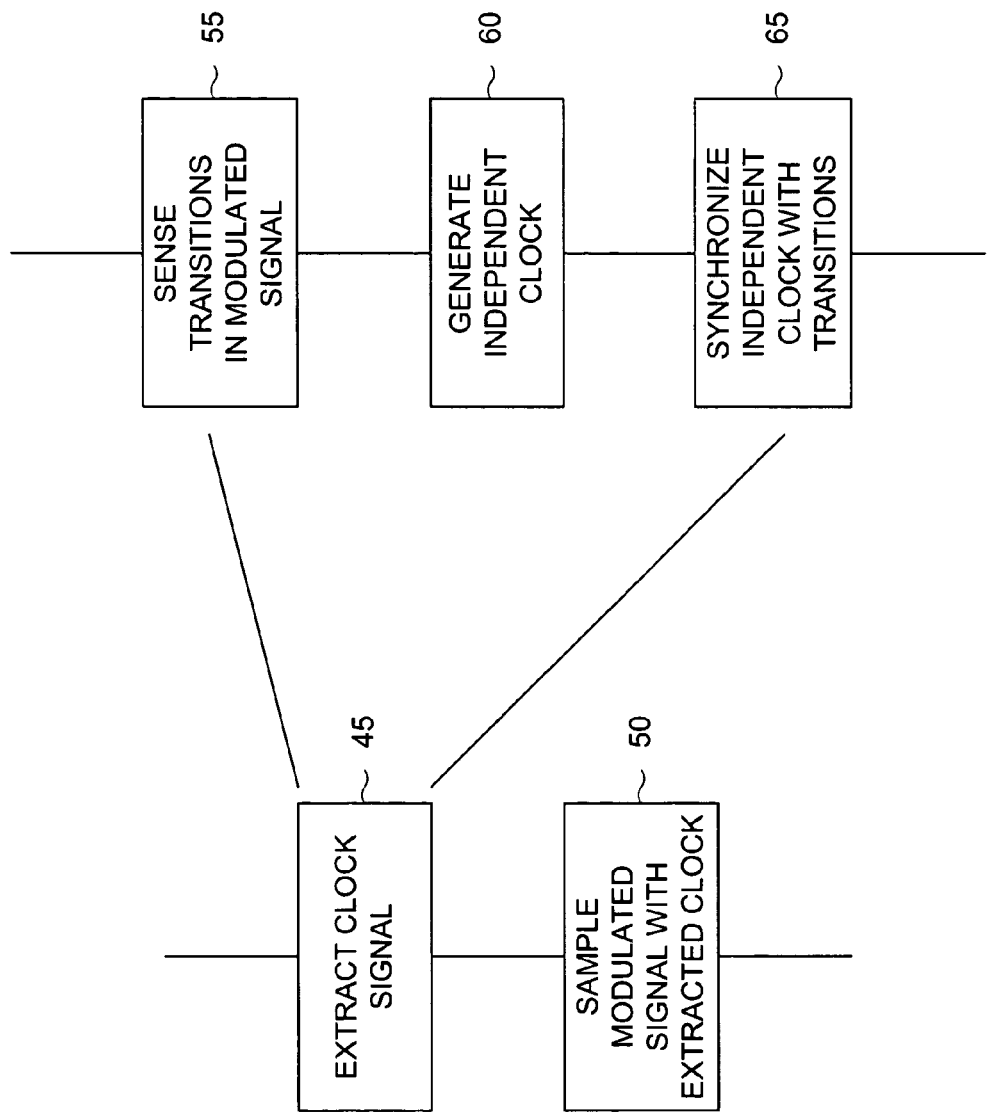
FIG. 3 is a flow diagram that depicts one illustrative method for extracting outbound data from a modulated signal received from a transformer according to the present invention.

FIG. 3 is a flow diagram that depicts one illustrative method for extracting outbound data from a modulated signal received from a transformer according to the present invention. According to this illustrative method, outbound data may be extracted from a modulated signal that is received in the isolated portion of an electronic circuit from the transformer. To effect data extraction, this illustrative method provides for extracting a clock signal (step 45) and then using the extracted clock signal to sample the modulated signal (step 50). According to yet another illustrative method of the present invention, extraction of the clock signal may comprise sensing transitions exhibited by the modulated signal (step 55) and generation of an independent clock (step 60). This independent clock may then be synchronized with the transitions exhibited by the modulated signal (step 65).

Figure 4:
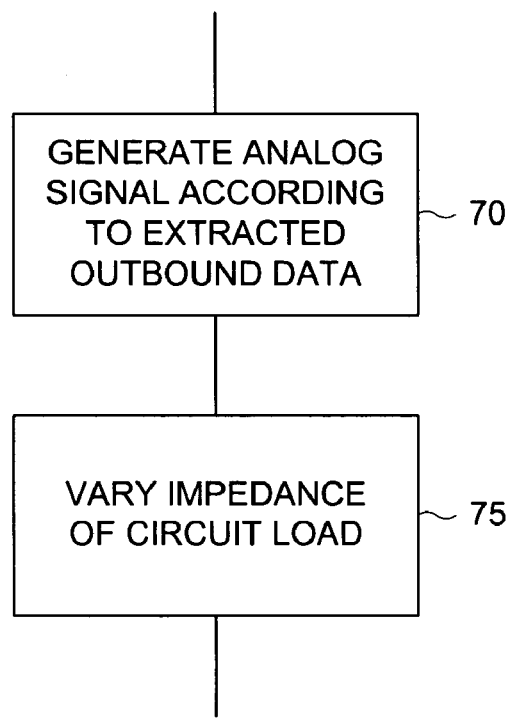
FIG. 4 is a flow diagram that depicts one example method for conveying bidirectional data to a communications channel according to the method of the present invention.

FIG. 4 is a flow diagram that depicts one example method for conveying bidirectional data to a communications channel according to the method of the present invention. The method of the present invention may be applied wherein an isolated portion of an electronic circuit is used as an interface to a communications channel. Accordingly, the method further provides that outbound data extracted from the transformer may be used to generate an analog signal (step 70). According to one alternative method of the present invention, a communications channel is terminated with a circuit load. The analog signal may then be used to vary the impedance of the circuit load thereby resulting in modulation of the circuit load according to the outbound data received in the isolated portion of the electronic circuit. This may be accomplished in a linear manner.

Figure 5:
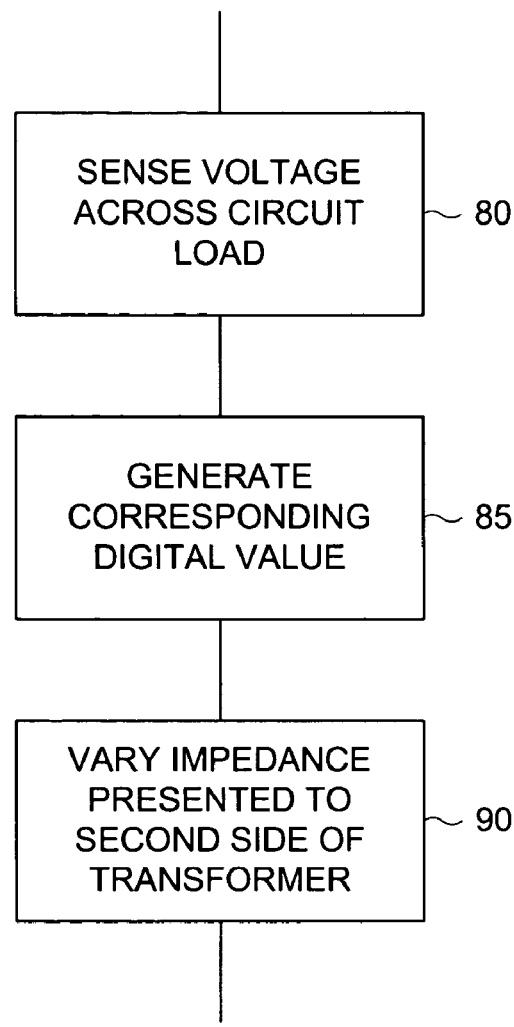
FIG. 5 is a flow diagram that depicts one illustrative method for receiving isolated inbound data from a communications channel according to the present invention.

FIG. 5 is a flow diagram that depicts one illustrative method for receiving isolated inbound data from a communications channel according to the present invention. In order to receive data from a communications channel, the communications channel is generally terminated with a circuit load. When such a communications channel is operating in a current mode, the voltage across the circuit load varies with the inbound data. One illustrative method of the present invention provides that the voltage across the circuit load (step 80) is used to generate a corresponding digital value (step 85). This digital value may then be used to vary the impedance presented to the second side of the transformer (step 90).

Figure 6:
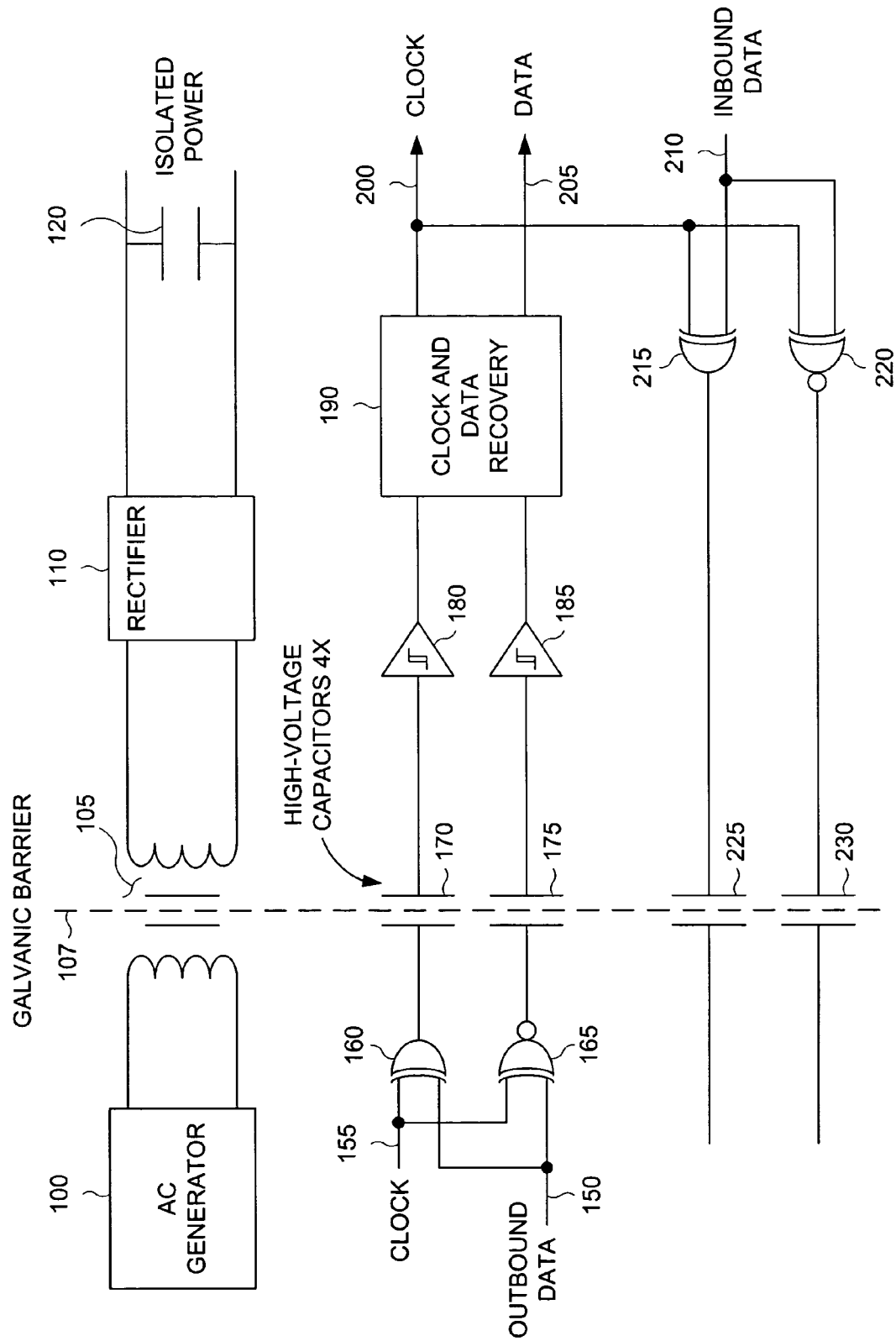
FIG. 6 is a block diagram that depicts one example structure of an apparatus used to convey bidirectional data across a galvanic barrier.

FIG. 6 is a block diagram that depicts one example structure of an apparatus used to convey bidirectional data across a galvanic barrier. This apparatus utilizes an AC generator 100 the output of which drives a transformer 105. The transformer 105 straddles a galvanic barrier 107, wherein the primary of the transformer is juxtaposed to a non-isolated portion of an electronic circuit and the secondary of the transformer is juxtaposed to an isolated portion of the electronic circuit. In order to generate isolated power, the signal received from the secondary side of the transformer 105 is usually processed by rectifier 110 resulting in a direct current voltage. The direct current voltage is typically filtered, e.g. by a capacitor 120. The filtered isolated power may then be used to power the isolated portion of the electronic circuit.

In order to convey data outbound from the non-isolated portion of the electronic circuit to the isolated portion of the electronic circuit, this apparatus modulates outbound data 150 using a clock signal 155. As can be perceived from the figure an exclusive OR and an exclusive NOR gate (160 and 165) may be used to generate differential modulated signals. These modulated signals may then be used to drive a pair of high-voltage capacitors (170,175) that also straddle the galvanic barrier 107. The AC nature of the differential modulated signals enables the differential modulated signals to pass through the high-voltage capacitors.

The differential modulated signals are then received by receivers (180,185). These receivers typically provide some level of hysteresis. A clock and data recovery circuit 190 is then used to extract clock and data signals (200, 205) from the differential modulated signals received from the capacitors (170,175). Inbound data 210 is modulated in a like manner by an exclusive OR and an exclusive NOR gate (215, 220) using the extracted clock signal 200. A second set of high-voltage capacitors (225, 230) are used to convey differential modulated inbound data signals across the galvanic barrier 107. Although this apparatus is effective for conveying bidirectional data across the galvanic barrier, it requires an isolation transformer to be used in conjunction with four high-voltage capacitors.

Figure 7A:
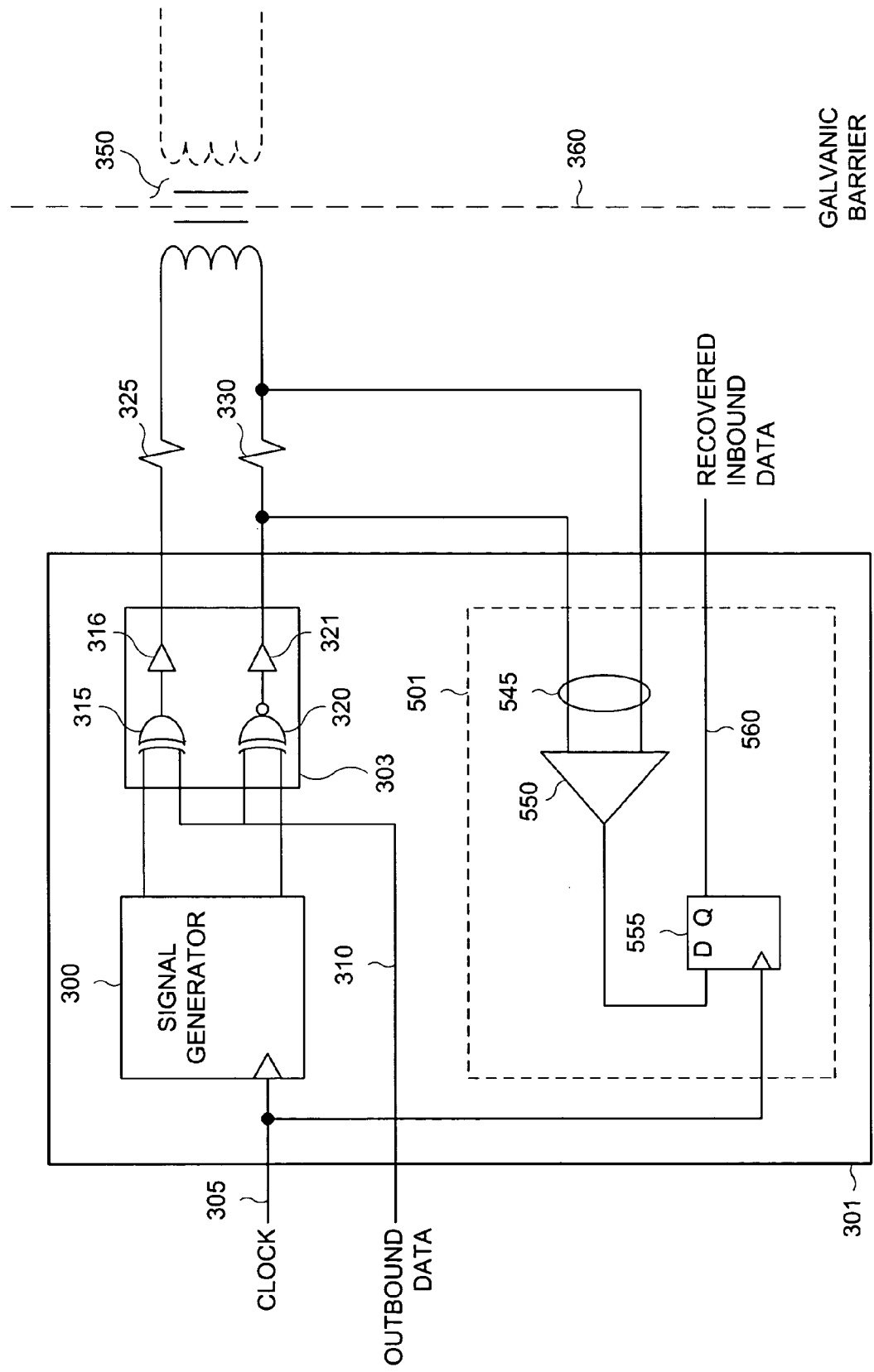
FIGS. 7A and 7B constitute a block diagram that depicts one example embodiment of an apparatus for conveying bidirectional data across a galvanic barrier according to the present invention.
Figure 7B:
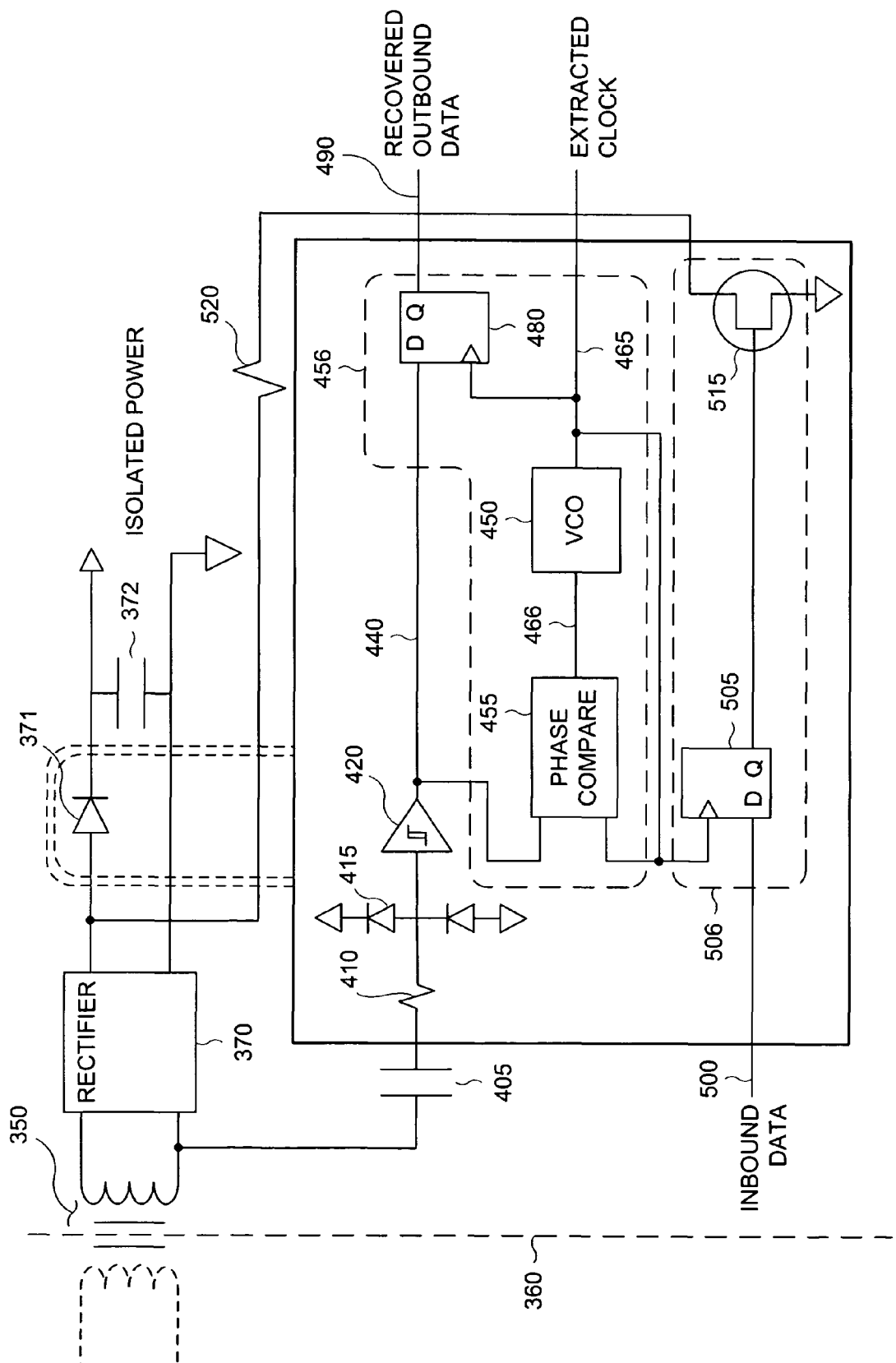

FIGS. 7A and 7B constitute a block diagram that depicts one example embodiment of an apparatus for conveying bidirectional data across a galvanic barrier according to the present invention. In contrast to known art, the present apparatus does not require any high-voltage capacitors for the conveyance of inbound and outbound data across a galvanic barrier 360. Referring to the figure, an isolated portion of an electronic circuit is powered by a transformer 350. This same transformer 350 is also used to convey outbound data from a non-isolated portion of the electronic circuit to the isolated portion of the electronic circuit. The same transformer 350 is also used to convey inbound data from the isolated portion of the electronic circuit to the non-isolated portion of the electronic circuit.

According to one illustrative embodiment of the present invention, an apparatus for conveying bidirectional data across the galvanic barrier comprises a signal generator 300, a signal modulator 303, a transformer 350, a data extractor 456, a transformer load modulator 506 and an inbound data recovery unit 501. One alternative embodiment of the invention further comprises a rectifier 370 that is capable of receiving a modulated signal from a second side of the transformer and converting the signal into a DC voltage source. Generally, the signal modulator 303 is capable of modulating a signal produced by the signal generator 300.

According to one alternative embodiment of the invention, the signal modulator 303 comprises a phase altering circuit. One example of such a phase altering circuit comprises an exclusive OR gate 315 and an exclusive NOR gate 320. These gates receive complementary signals from the signal generator 300 and each receives outbound data 310. Complementary modulated signals emanating from these gates may be directed through optional power drivers (316, 321) that may be necessary to drive the transformer 350 with sufficient power to provide isolated power to the isolated portion of the electronic circuit. It should be noted that the power drivers are optional. In one alternative embodiment, the exclusive OR and exclusive NOR gates may themselves comprises high current drivers capable of driving the power transformer 350 with sufficient power to provide isolated power to the isolated portion of electronic circuit.

It should be further noted that the transformer 350 straddles the galvanic barrier 360. Although the term "galvanic barrier" is used in accordance with the vernacular of the art, it is somewhat of a misnomer. In fact, there is no physical barrier, per se, between the isolated and non-isolated portions of the electronic circuit. Rather, the barrier is said to exist as a result of physical separation between the two portions of the electronic circuit. Hence, the primary of the transformer 350 is juxtaposed to the non-isolated portion of the electronic circuit whereas the secondary of the transformer is juxtaposed to the isolated portion of electronic circuit.

According to one alternative embodiment, the data extractor 456 receives a modulated signal from the second side of the transformer 350. This may be accomplished by sensing transitions exhibited by one lead of the transformer. Accordingly, a capacitor 405 may be used to sense these transitions. Conditioning circuitry, comprised of a current limiting resistor 410 and clamping diodes 415, may be used to ensure that the signal received from the transformer does not electrically damage a hysteresis device 420. The conditioning circuitry may further comprise said hysteresis device 420. The output of the hysteresis device 420 constitutes a conditioned rendition of the modulated signal received from the second side of the transformer 350. The data extractor 456 extracts outbound data 490 from this conditioned rendition of the modulated signal received from the second side of the transformer.

According to one illustrative embodiment of the invention, the data extractor 456 comprises a controllable oscillator 450, e.g. a voltage controlled oscillator (VCO). The data extractor 456 further comprises a comparator 455 that generates a correction signal 466 according to the difference between the clock generated by the controllable oscillator 450 (which constitutes the extracted clock signal 465) and transitions exhibited by the modulated signal 440 received from the second side of the transformer 350. The correction signal 466 is used to control the controllable oscillator 450. The output of the controllable oscillator 450, i.e. the extracted clock 465, constitutes a clock that is synchronized with the transitions exhibited by the modulated signal 440 received from the second side of the transformer. The data extractor 456 further comprises a sampling device 480 that is driven by the extracted clock 465 and samples the modulated signal 440 received from the second side of the transformer. This results in an extracted data signal, i.e. the recovered outbound data 490.

Inbound data 500 may be directed to the transformer load modulator 506. The transformer load modulator typically synchronizes the inbound data 500 with the clock 465 extracted by the data extractor from the modulated signal received from the second side of the transformer. The synchronized inbound data may then be used to control a switch 515. It should be noted that according to one illustrative embodiment of the present invention, the transformer load modulator 506 comprises a synchronization element 505, e.g. a flip-flop, and a switch 515. The invention may further comprise an impedance element 520 that is shunt across the output of the rectifier 370 by the switch 515. When the impedance element is shunted across the output of the rectifier 370, the DC voltage source provided by the output of the rectifier 370 may experience additional current draw, which is reflected back the primary side of the transformer. The switch may comprise a solid-state switch, e.g. a transistor.

It should be further noted that modulation of the transformer load in this manner may cause the isolated power provided by the rectifier to the isolated portion of the electronic circuit to exhibit undesirable voltage fluctuations. In order to prevent this, one alternative embodiment of the present invention further comprises a protection diode 371. The protection diode is disposed between the output of the rectifier and a filtering device 372. Hence, the filtering device 372 will minimize these undesirable voltage fluctuations since energy stored in the filtering element 372 will not be drawn backward through the protection diode 371 into the impedance element 520 when it is switched across the output of the rectifier 370.

Figure 8:
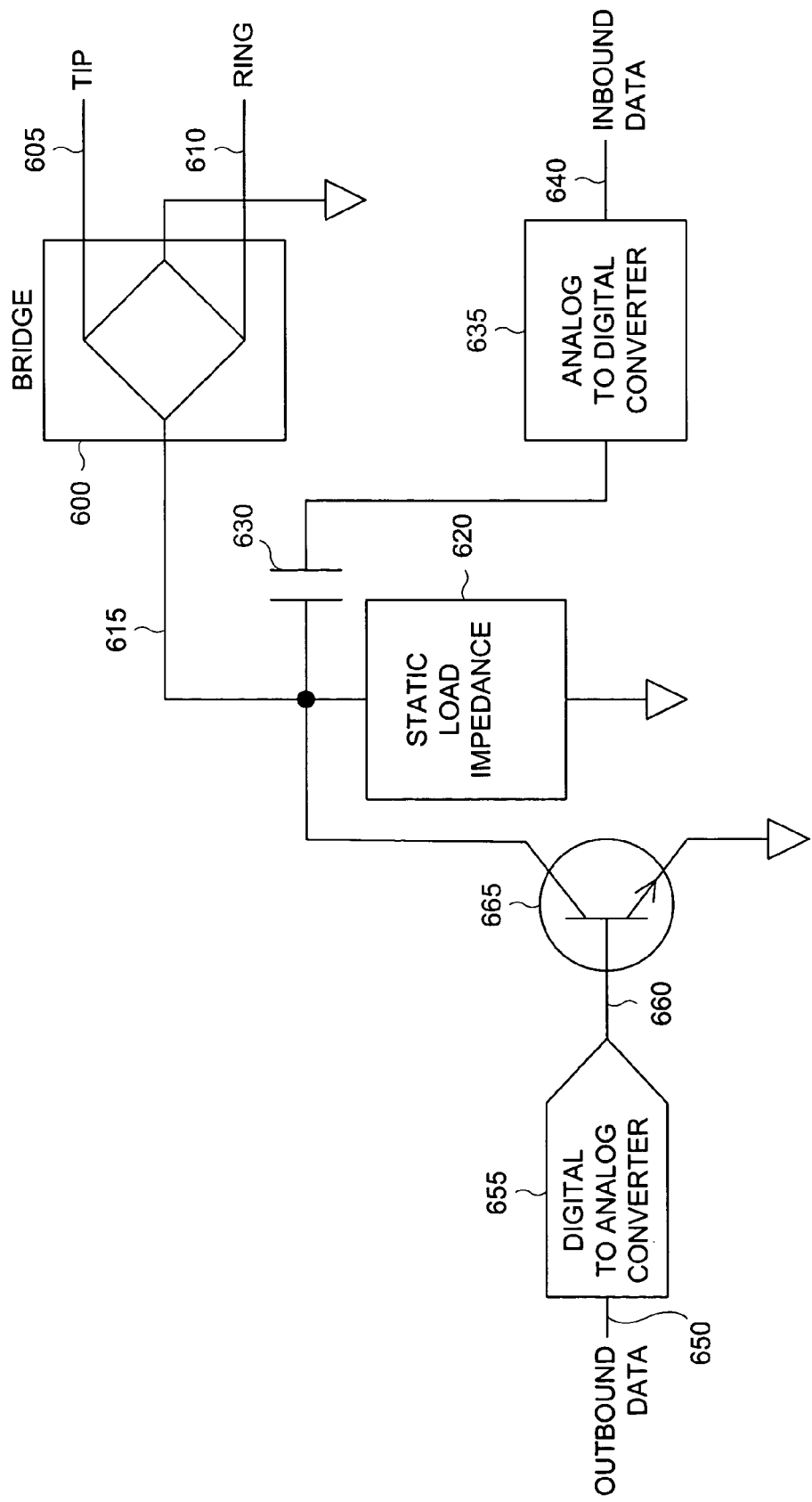
FIG. 8 is a block diagram that depicts one alternative embodiment of an apparatus for conveying bidirectional data to and from an isolated communications channel according to the present invention.

FIG. 8 is a block diagram that depicts one alternative embodiment of an apparatus for conveying bidirectional data to and from an isolated communications channel according to the present invention. According to one illustrative embodiment of the present invention, the isolated portion of an electronic circuit may further comprise a digital-to-analog converter 655. The outbound data 650 recovered from the second side of the transformer 350 by the data extractor 456 may be converted into an analog signal 660 by the digital-to-analog converter 655. The analog signal 660 may be used to vary the impedance presented to a communications channel in a linear manner. This may be accomplished by a transistor 665, which further constitutes the invention. The apparatus, according to this illustrative embodiment of the invention, may further comprise a static load impedance 620 and a bridge element 600. The bridge element 600 typically provides rectification of "tip" and "ring" (605, 610) signal lines constituting a communications channel, e.g. a telephone line.

Yet another alternative embodiment of this invention, the apparatus further comprises an analog-to-digital converter 635. The analog-to-digital converter 635 typically converts the voltage present across the static load impedance 620 into a digital value representative of the inbound data received from the communications channel. Typically, AC sensing of the voltage across the static load impedance is effected through a capacitor 630. The analog-to-digital converter 635 converts the voltage present across a static load impedance 620 into inbound data 640. The inbound data 640 may then be used to vary the impedance presented to the second side of the transformer.

Figure 9:
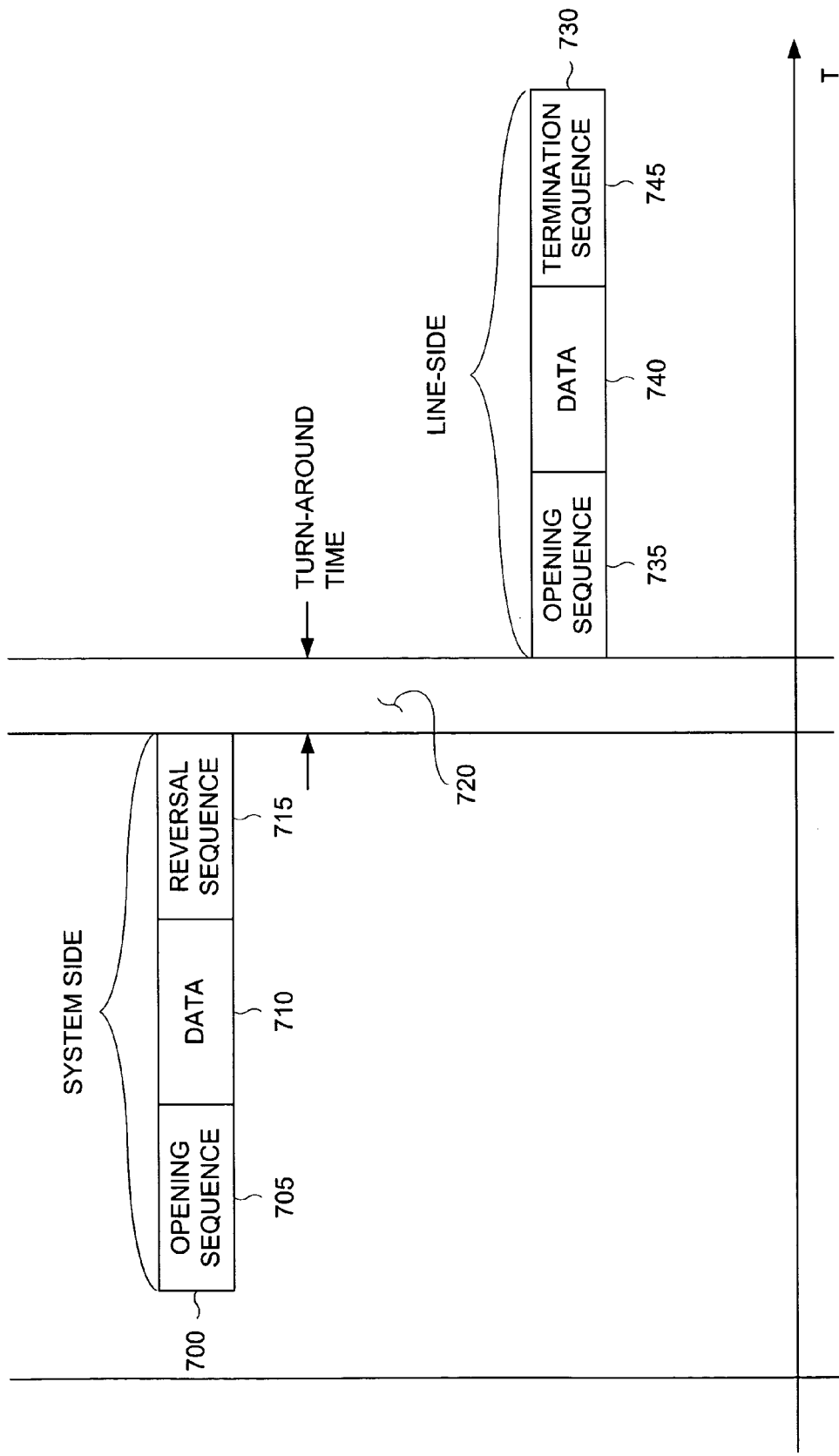
FIG. 9 is a timing diagram that depicts the transfer of bidirectional data across a galvanic barrier according to the method and apparatus of the present invention.

FIG. 9 is a timing diagram that depicts the transfer of bidirectional data across a galvanic barrier according to the method and apparatus of the present invention. Generally, data from the non-isolated portion of the electronic circuit is propagated across a galvanic barrier using a data packet 700. Typically, the data packet 700 comprises an opening sequence 705, a data container 710 and a reversal sequence 715. This outbound data packet 700 is generally said to be the "system side" data. According to the method of the present invention, inbound data is received during a period of outbound data quiescence. The system side data packet is terminated with the reversal sequence 715, which may be used by the isolated portion of the electronic circuit, also known as the "line-side" circuit, to initiate transfer of inbound data from the isolated portion of the electronic circuit to the non-isolated portion of the electronic circuit. The inbound data may be conveyed using an inbound data packet 730, which comprises an opening sequence 735, a data container 740 and a termination sequence 745.

FIGS. 7A and 7B further depict that the method of the present invention may be embodied as a system-side isolation controller. Said system-side isolation controller may comprise a signal generator 300, a signal modulator 303 and an inbound data recovery unit 501. The system-side isolation controller, according to one illustrative embodiment, may further comprise a transformer driver (316, 321) that is capable of driving a transformer with sufficient power so as to power an isolated portion of an electronic circuit.

According to yet another illustrative embodiment, the invention further comprises a line-side isolation controller. The line-side isolation controller may comprise a data extractor 456 and a transformer load modulator 506. In yet one other illustrative embodiment, the data extractor comprises a clock extractor and a sampling devices according to the teachings of the method and apparatus of the present invention. Accordingly, the clock extractor may comprises a controllable oscillator and a comparator as heretofore described. According to yet another embodiment of the invention, the line-side isolation controller may further comprise a digital-to-analog converter and an analog gate for imparting an impedance element across a line-circuit-load. The line-side isolation controller may yet further comprise an analog-to-digital and a switch. The analog-to-digital converter, according to the teaching already presented, is capable of generating a digital value according to incoming data. This digital value may then be used to control the switch, which may then be used to attach additional load to a second side of a transformer.

Alternative Embodiments

While this invention has been described in terms of several preferred embodiments, it is contemplated that alternatives, modifications, permutations, and equivalents thereof will become apparent to those skilled in the art upon a reading of the specification and study of the drawings. It is therefore intended that the true spirit and scope of the present invention include all such alternatives, modifications, permutations, and equivalents.

What is claimed is:

1. A method for conveying bidirectional data over a transformer comprising the steps of:
   modulating an alternating current signal with outbound data;
   driving a first side of the transformer with the modulated signal;
   receiving the modulated signal from a second side of the transformer;
   extracting outbound data from the received modulated signal using a comparator;
   modulating according to inbound data the load presented to the second side of the transformer using a switch connected to ground when the alternating current signal is not modulated; and
   receiving inbound data by sensing said load modulation.

2. The method of claim 1 wherein modulating the alternating current signal with outbound data comprises switching the phase of an alternating current signal according to a serial bit stream coincident with a clock.

3. The method of claim 1 wherein extracting outbound data comprises:
   extracting a clock signal from the received modulated signal; and
   sampling the received modulated signal according to the extracted clock signal.

4. The method of claim 3 wherein extracting a clock signal comprises:
   sensing transitions in the received modulated signal;
   generating an independent clock signal; and
   synchronizing the independent clock with the transitions.

5. The method of claim 1 wherein modulating the load presented to the second side of the transformer comprises:
   varying the impedance presented to the transformer according to a serial data stream coincident with an extracted clock signal.

6. The method of claim 1 further comprising:
   generating an analog signal according to the extracted outbound data signal; and
   varying the impedance of a circuit load according to the analog signal.

7. The method of claim 1 wherein modulating the load presented to the second side of the transformer comprises:
   generating a digital value according to the voltage across a circuit load coincident with an extracted clock signal; and
   varying the impedance presented to the second side of the transformer according to the digital value.

8. An apparatus for conveying bidirectional data across a galvanic barrier comprising:
- a signal generator;
- a signal modulator for modulating with outbound data a signal produced by the signal generator;
- a transformer having a first side for receiving a modulated signal from the signal modulator and a second side;
- a data extractor for extracting outbound data from a modulated signal received from the second side of the transformer, the data extractor further comprising a comparator;
- a transformer load modulator for modulating the load on the second side of the transformer utilizing a switch configured to be coupled to ground, according to inbound data; and
- an inbound data recovery unit for determining inbound data by sensing load modulations induced by the transformer load modulator.

9. The apparatus of claim 8 wherein the signal modulator comprises a phase modulator for altering the phase of the signal coincident with a clock.

10. The apparatus of claim 8 wherein the data extractor comprises:
- a clock extractor for extracting a clock from a received modulated signal; and
- a sampling device for sampling the received modulated signal according to the extracted clock.

11. The apparatus of claim 10 wherein the clock extractor comprises:
- a controllable oscillator for generating a clock according to a control signal; and
- the comparator is for generating the control signal by comparing transitions in a received modulated signal with transitions in the generated clock.

12. The apparatus of claim 8 wherein the transformer load modulator comprises:
- an impedance element;
- a synchronizer for synchronizing inbound data with an extracted clock signal; and
- the switch for attaching the impedance element to the second side of the transformer according to the synchronized inbound data.

13. The apparatus of claim 8 further comprising:
- a digital-to-analog converter for capable of generating an analog signal according to extracted outbound data;
- a line circuit load for presenting a load to a communications channel;
- an impedance element; and
- an analog gate for linearly imparting the impedance element across the line circuit load according to the analog signal.

14. The apparatus of claim 8 further comprising:
- a line circuit load for presenting a load to a communications channel;
- an analog-to-digital converter for generating a digital value according the voltage present across the line circuit load;
- an impedance element; and
- a switch for attaching the impedance element to the second side of the transformer according to the digital value.

15. A system-side isolation controller comprising:
- a signal generator;
- a signal modulator for modulating a signal produced by the signal generator, the signal modulator comprising an exclusive OR gate and an exclusive NOR gate; and
- an inbound data recovery unit for determining inbound data by sensing load modulations exhibited by a transformer, wherein the load modulations are generated using a switch coupled to ground.

16. The system-side isolation controller of claim 15 further comprising a transformer driver for driving the transformer with the modulated signal.

17. A line-side isolation controller comprising:
- a data extractor for extracting outbound data from a modulated signal received from a second side of a transformer, the data extractor comprising a comparator; and
- a transformer load modulator utilizing a switch coupled to ground for modulating the load presented to the second side of the transformer according to inbound data.

18. The line-side isolation controller of claim 17 wherein the data extractor comprises:
- a clock extractor for extracting a clock signal from a received modulated signal; and
- a sampling device for sampling the received modulated signal according to the extracted clock signal.

19. The line-side isolation controller of claim 18 wherein the clock extractor comprises:
- a controllable oscillator for generating a clock according to a control signal; and
- the comparator is for generating the control signal by comparing transitions in a received modulated signal with transitions in the generated clock.

20. The line-side isolation controller of claim 17 further comprising:
- a digital-to-analog converter for generating an analog signal according to extracted outbound data;
- an analog gate for linearly imparting a first impedance element across a line circuit load according to the analog signal;
- an analog-to-digital converter for generating a digital value according the voltage present across the line circuit load;
- an impedance element; and
- the switch configured for attaching a second impedance element of the second side of the transformer to ground according to the digital value.

* * * * *

UNITED STATES PATENT AND TRADEMARK OFFICE
CERTIFICATE OF CORRECTION

| | | |
|---|---|---|
| PATENT NO. | : 7,881,461 B2 | |
| APPLICATION NO. | : 10/697819 | |
| DATED | : February 1, 2011 | |
| INVENTOR(S) | : James B. Skov et al. | |

It is certified that error appears in the above-identified patent and that said Letters Patent is hereby corrected as shown below:

Col. 11, line 47, please delete "capable of."

Signed and Sealed this
Twenty-sixth Day of April, 2011

David J. Kappos
*Director of the United States Patent and Trademark Office*